United States Patent
Palffy et al.

(10) Patent No.: US 7,028,752 B2
(45) Date of Patent: Apr. 18, 2006

(54) VENTILATION DEVICE

(75) Inventors: Sandor Palffy, Ennetbaden (CH); Christoph Holliger, Boniswil (CH)

(73) Assignee: Fensterfabrik Albisrieden AG, Zurich (CH)

( * ) Notice: Subject to any disclaimer, the term of this patent is extended or adjusted under 35 U.S.C. 154(b) by 254 days.

(21) Appl. No.: 10/285,812

(22) Filed: Nov. 1, 2002

(65) Prior Publication Data

US 2003/0089492 A1    May 15, 2003

(30) Foreign Application Priority Data

Nov. 1, 2001    (EP)    .................................. 01811065

(51) Int. Cl.
F24F 7/00    (2006.01)

(52) U.S. Cl. ........................ 165/54; 165/166; 165/164; 165/909

(58) Field of Classification Search ................. 165/54, 165/166, 164, 909
See application file for complete search history.

(56) References Cited

U.S. PATENT DOCUMENTS

| 3,731,736 | A | * | 5/1973 | Fernandes | ................... | 165/166 |
| 4,141,412 | A | * | 2/1979 | Culbertson | .................. | 165/166 |
| 4,232,821 | A | * | 11/1980 | Backlund | ................... | 237/2 B |
| 4,282,927 | A | * | 8/1981 | Simmons | ..................... | 165/166 |
| 4,377,201 | A | * | 3/1983 | Kruse et al. | .................. | 165/76 |
| 4,512,392 | A | * | 4/1985 | van Ee et al. | ................ | 165/54 |
| 4,579,163 | A | * | 4/1986 | Maendel | ....................... | 165/54 |
| 5,000,253 | A | | 3/1991 | Komarnicki | | |
| 5,078,208 | A | * | 1/1992 | Urch | .......................... | 165/166 |
| 5,829,513 | A | | 11/1998 | Urch | | |

FOREIGN PATENT DOCUMENTS

DE    3313936 A    *    12/1983

(Continued)

*Primary Examiner*—John K. Ford
(74) *Attorney, Agent, or Firm*—Abelman, Frayne & Schwab

(57) ABSTRACT

An incoming air duct (9) and an exhaust air duct (12) which connect an incoming air inlet (14) and an exhaust air outlet (10), respectively, in an outside side-wall (1*b*) to an incoming air outlet (13) and an exhaust air inlet (11) in a room-facing side wall (1*a*) are arranged side by side, separated only by partitions (8) of aluminium sheet, to permit heat exchange between the exhaust air flow and the opposite incoming air flow over a plurality of straight sections (6*a*, 6*b*, 6*c*, 6*d*, 6*e*) of a double duct which are connected by deflections (7*a*, 7*b*, 7*c*, 7*d*) of in each case 180°. Directly successive straight sections (6*a*, 6*b*, 6*c*, 6*d*, 6*e*) are separated by intermediate walls (5*a*, 5*b*, 5*c*, 5*d*) which, at a deflection (7*a*, 7*b*, 7*c*, 7*d*), are in each case slightly shorter than the adjacent partitions (8) so that an inner passage (20) is left between the end of the intermediate wall (5*a*, 5*b*, 5*c*, 5*d*) and a deflecting wall (19) adjacent to the ends of the partition (8) and the side walls (1*a*, 1*b*) and having the shape of a parallelogram, and an outer passage (21) is left between said inner passage and an end wall (2*a*, 2*b*), which passages each connect the straight segments of the incoming air duct (9) and of the exhaust air duct (12), respectively, to one another, or vice versa.

17 Claims, 2 Drawing Sheets

FOREIGN PATENT DOCUMENTS

| | | |
|---|---|---|
| DE | 32 302 79 A | 2/1984 |
| DE | 34 267 78 A | 5/1985 |
| DE | 33 47 028 A | 7/1985 |
| DE | 37 11 301 A | 10/1988 |
| DE | 29802426 U * | 4/1998 |
| DE | 197 53 986 A | 6/1999 |
| EP | 0 952 409 A | 10/1999 |
| WO | WO 96/12145 | 4/1996 |

* cited by examiner

VENTILATION DEVICE

FIELD OF THE INVENTION

The invention relates to a ventilation device. Such ventilation devices make it possible to replace exhaust air from a closed room with incoming air which is supplied from outside and exchanges heat with the exhaust air.

PRIOR ART

DE-A-33 47 028 discloses a ventilation device of the generic type which is integrated in a window frame. The incoming air duct and the exhaust air duct are each led almost completely around the window, over a part of the circumference as a double duct which is deflected at two corners of the window frame by 90° in each case. This arrangement requires a great deal of space and can be used virtually only in the form described, i.e. with integration in a window frame or the like. The length of the double duct and hence the degree of heat exchange achievable is determined substantially by the dimensions of the window frame. The flow is likely to have relatively little turbulence so that the heat transfer tends to remain small owing to the formation of laminar flow, at any rate unless additional measures are taken, for example heat exchanger ribs provided.

In a similar ventilation device according to DE-A-32 30 279, the double duct extends over only one side of the window frame. Here, the heat transfer is likely to remain relatively small in spite of heat exchanger ribs or concentric laying of the incoming air duct and of the exhaust air duct.

DE-A-34 26 778 describes a ventilation device which can likewise be installed, for example, in a crossbeam of a window frame. Here, incoming air duct and exhaust air duct are divided into straight part-ducts separated by lamellae, in such a way that incoming air and exhaust air part-ducts alternate. The design of the apparatus is therefore relatively complex. The more numerous and the narrower the part-ducts for achieving efficient heat transfer, the higher is also the flow resistance.

WO-A-96/12 145 discloses a basically similar ventilation device in which the part-ducts are arranged concentrically and are helical. This ventilation device is likely to have the same disadvantages as the last-mentioned one. In particular, the design is very complex and the production is likely to be correspondingly expensive.

SUMMARY OF THE INVENTION

It is the object of the invention to provide a ventilation device of the generic type which is compact and simple in design and has good efficiency of the heat exchanger. This object is achieved by the features of the invention as recited in the claims.

The invention provides a ventilation device of the generic type which moreover has a compact design and whose shape and dimensions can be adapted to various boundary conditions. The design can in particular be such that the device is modular, i.e. can be composed of simple prefabricated parts, and embodiments of different sizes, in particular different lengths of the double duct, can be constructed from parts of the same type. The efficiency of the heat exchanger is very high even in the case of a relatively short double duct, since any laminar flow forming in the straight sections is eliminated at the 180° deflections and turbulence is produced so that the heat transfer assumes high values over the total length of the double duct. Moreover, the deflections have the effect of reducing the influence of any wind pressure on incoming air flow and the transmission of sound via the double duct.

BRIEF DESCRIPTION OF THE DRAWINGS

The invention is explained in more detail below with reference to figures which show only examples.

DESCRIPTION OF THE PREFERRED EMBODIMENTS

Figure 1:
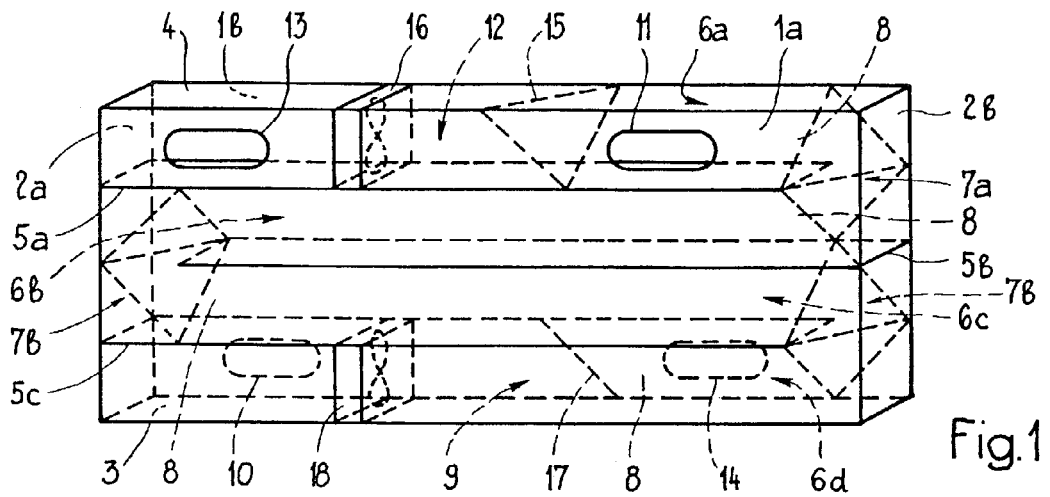
FIG. 1 shows a schematic perspective view of a first embodiment of a ventilation device according to the invention.

According to a first embodiment, the ventilation device according to the invention is in the form of a right parallelepiped having two parallel perpendicular side walls 1a,b, which are connected by end walls 2a,b which are normal to said side walls and likewise perpendicular. Between a horizontal baseplate 3 and a horizontal cover plate 4, intermediate walls 5a–c parallel thereto are arranged one on top of the other at regular intervals. Each of the intermediate walls 5a–c extends from the side wall 1a to the side wall 1b and alternately from the end wall 2a to close to the opposite end wall 2b—in such a way that a passage is left there—and vice versa. It thus forms a meandering double duct comprising straight sections 6a–d of approximately square cross-section in each case and deflections 7a–c which have a deflection angle of 180° in each case and each of which connects two directly successive straight sections.

Figure 2:
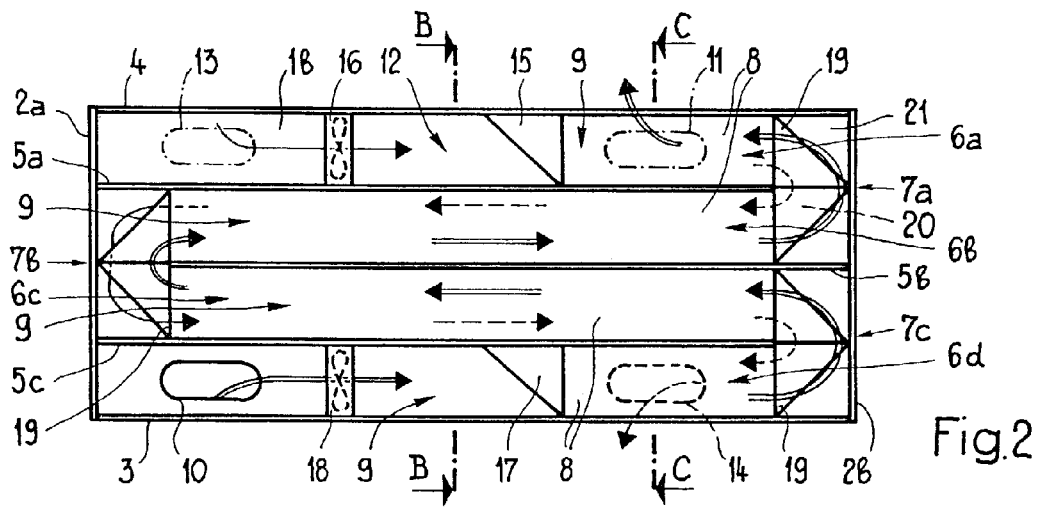
FIG. 2 shows a side view of the first embodiment of the ventilation device according to the invention, the front side wall being omitted.
Figures 3A, 3B, 3C, 3D:
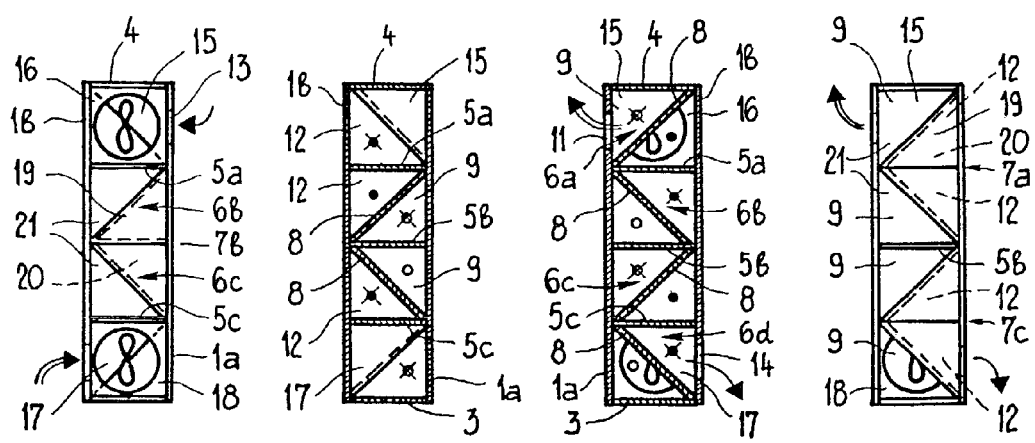
FIG. 3a shows a front view with omitted end wall, corresponding to a view from the left in FIG. 2.
FIG. 3b shows a section along B—B in FIG. 2.
FIG. 3c shows a section along C—C in FIG. 2.
FIG. 3d shows a front view with omitted end wall, corresponding to a view from the right in FIG. 2.

Each of the straight sections 6a–d of the double duct is divided into two by a diagonal partition 8 which extends in each case over the total length thereof and leaves only the deflections free so that said sections are divided into two halves each of triangular cross-section. One half belongs in each case to an incoming air duct 9, which connects an incoming air inlet 10 to an incoming air outlet 11, and the other half to an exhaust air duct 12, which connects an exhaust air inlet 13 to an exhaust air outlet 14. The incoming air inlet 10 and the exhaust air outlet 14 pass through the outside side wall 1b at the bottom left and bottom right, respectively, while the incoming air outlet 11 and the exhaust air inlet 13 pass through the room-facing side wall 1a at the top (the incoming air outlet 11 and the exhaust air inlet 13 are also indicated in FIG. 2, although the side wall 1a is omitted). The inlets and outlets may each have a grating or may consist of a plurality of slots, preferably perpendicular to the direction of the respective duct. The partitions 8 of directly successive straight sections are inclined in opposition directions. They should consist of material which has good thermal conductivity and whose surfaces are preferably structured for increasing the surface area and generating turbulence. In particular ribbed or corrugated thin metal sheet, especially aluminium sheet, is very suitable.

In the uppermost part of the ventilation device which is bounded by the cover plate 4 and the first intermediate wall 5a, the partition 8 extends from the right to over the incoming air outlet 11, where an inclined triangular closure wall 15 seals off the incoming air duct 9 so as that the exhaust air duct 12 widens towards the left until it occupies the entire cross-section otherwise occupied by the double duct. In this part, an exhaust air fan 16 arranged to the right of the exhaust air inlet 13.

In that lowermost part of the ventilation device which is bounded by baseplate 2 and the third intermediate wall 5c, the partition 8 extends, in an entirely corresponding manner, from the right to over the exhaust air outlet 14, where an inclined triangular closure wall 17 seals off the exhaust air duct 12 so that the incoming air duct 9 widens toward the left until it occupies the entire cross-section otherwise occupied by the double duct. In this part, an incoming air fan 18 is arranged to the right of the incoming air inlet 9. The ventilation device may have, for example, on the outside side wall 1b, solar cells which supply the fans via a battery. On the other hand, connection to the power supply is also possible. In any case, the fans and hence the intensity of the air exchange can be controlled or regulated. It is then of course also possible to allow only the exhaust air fan 16 to run, for example for cooling during the night. During normal operation, both fans run at about the same speed.

A deflecting wall 19 which in each case connects the two duct segments of those straight sections of the double duct which are connected there and are adjacent to the intermediate wall 5a and the two remaining duct segments to one another is arranged at the first deflection 7a. For this purpose, the deflecting wall 19 comprises in each case two triangular segments which are each adjacent at one side to the end of one of the partitions 8 flush with the intermediate wall 5a and at a further side to the side wall 1b, while the remaining sides of the two triangular segments are adjacent to one another.

They thus form a half lateral area of a square pyramid, which lateral area is cut off along a diagonal plane and whose base sides are adjacent to the ends of the partitions 8, while the sides of the lateral areas are adjacent to the side wall 1b. The vertex of said half-pyramid abuts the inside of the end wall 2b. The deflecting wall 19 thus separates an inner passage 20, which connects those segments of the exhaust air duct 12 and which are adjacent to the intermediate wall 6a, from an outer passage 21, which connects the corresponding segments of the incoming air duct 9 to one another. The deflecting wall 19 may consist of the same material as the partitions 8. It may be completely or in each case partly integral with one of said partitions or both of them. It is preferably a separate component. The deflection 7a preferably has sharp edges.

The third deflection 7c corresponds exactly to the first, deflection 7a. The second deflection 7b corresponds to a rotation of the first deflection 7a through 180°, i.e. the deflecting wall 19 is adjacent to the side wall 1a. The incoming air duct 9 is on the inside and the exhaust air duct 12 on the outside.

In the region of the exhaust air inlet 13 and of the exhaust air fan 16, the exhaust air duct 12 occupies the entire cross-section between the cover plate 3, the intermediate wall 5a and the side walls 1a, 1b. It is then continuously constricted in the direction of flow by the closure wall 15, until it occupies only the rear bottom half (in FIG. 1, 2) of the first straight section 6a of the double duct, while the front top half is occupied by that region of the incoming air duct 9 which surrounds the incoming air outlet 11. At the first deflection 7a, the exhaust air duct 9 is deflected by 180°. It is connected by the inner passage 20 to the rear top half of the second straight section 6b of the double duct, through which it continues to the second deflection 7b. There, it is connected via the outer passage 21 to the rear bottom half of the third straight section 6c of the double duct, through which it continues to the third deflection 7c, where it is finally connected, once again by the inner passage 20, to the rear top half of the fourth and last straight section 6d of the double duct. The latter is sealed off to the left of the exhaust air outlet 14 by the closure wall 17. The exhaust air duct 12 is thus always at the rear and is therefore always adjacent to the outside side wall 1b.

The incoming air duct 9 runs completely analogously from the incoming air inlet 10 to the incoming air outlet 11, occupying in each case the complementary halves of the straight sections 6d–a of the double duct and the complementary passages of the deflections 7c–a. It is always at the front and is therefore always adjacent to the room-facing side wall 1a.

The exhaust air flow is shown in the figures by a single arrow and, where the direction of flow is normal to the plane of the diagram, by a dot, on which a cross is superposed where the direction of flow corresponds to the viewing direction. In an analogous manner, the incoming air flow is shown by a double arrow or by a circle. Incoming air flow and exhaust air flow are in opposite directions and are separated over the entire length of the double duct only by the thin, readily heat-conducting partitions 8 and deflecting walls 19. Together with the turbulence of the two flows which is promoted by the sharp-edged 180° deflections, this results in extremely efficient heat transfer from the exhaust air to the incoming air or, in the case of a cooled room, from the incoming air to the exhaust air, so that the temperature of the incoming air has already closely approached room temperature before the incoming air emerges through the incoming air outlet 11. Thus, energy can be saved during heating as well as during cooling. Moreover, the problem of cold incoming air flows which impair comfort in a heated room is overcome.

The ventilation device according to a second embodiment shown in FIGS. 4, 5a–d, 6 corresponds in its basic design to the ventilation device according to the first embodiment. The ventilation device which is once again right parallelepiped and has side walls 1a,b, end walls 2a,b, baseplate 3 and cover plate 4 contains intermediate walls 5a–d which separate straight sections 6a–e of the double duct from one another and which are connected by deflections 7a–d, once again with a deflection angle of 180°.

Figure 4:
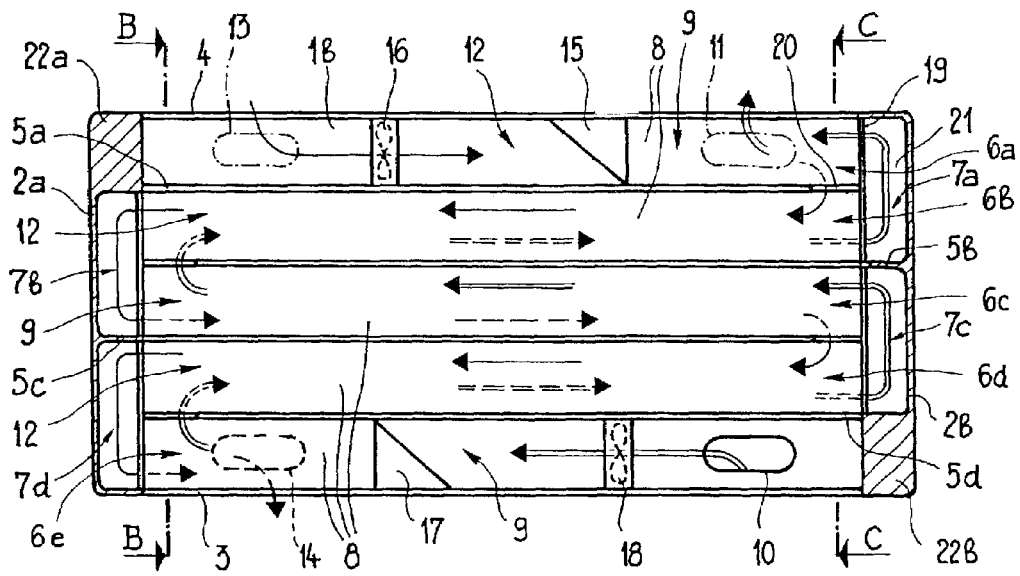
FIG. 4 shows a side view of a second embodiment of a ventilation device according to the invention, the front side wall being omitted.
Figures 5A, 5B, 5C, 5D:
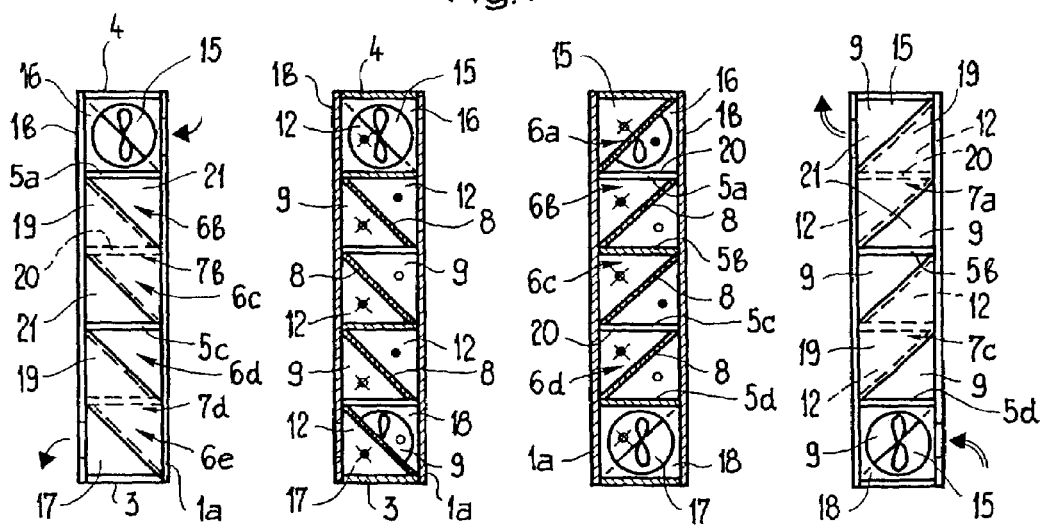
FIG. 5a shows a front view with omitted cap, corresponding to a view from the left in FIG. 4.
FIG. 5b shows a section along B—B in FIG. 4.
FIG. 5c shows a section along C—C in FIG. 4.
FIG. 5d shows a front view with omitted cap, corresponding to a view from the right in FIG. 4.
Figure 6:
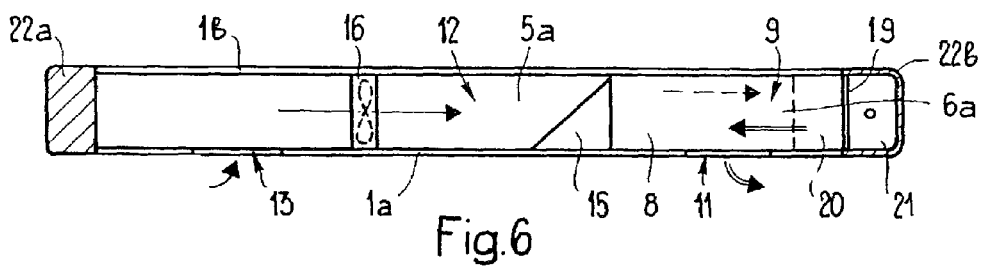
FIG. 6 shows a plan view with omitted cover plate.

On the other hand, the partitions 8 of all straight sections 6a–e of the double duct are inclined backwards in the same direction (FIG. 4). The incoming air duct 9 and the exhaust air duct 12 are alternately at the front and rear, i.e. first adjacent to the room-facing side wall 1a and then adjacent to the outside side wall 1b. Accordingly, the deflections 7a–d are also formed differently.

The first deflection 7a comprises a deflecting wall 19 which has the shape of a parallelogram and is arranged parallel to the end wall 1b and a distance in front of it, so that the inclined sides of the deflecting wall 19 are adjacent to the edges of the partitions 8 of the first straight section 6a and of the second straight section 6b of the double duct, while the remaining perpendicular sides are adjacent to the side walls 1a, 1b. Since the partition 5a does not continue to the deflecting wall 19, an inner passage 20 remains between the latter and the end of the partition 5a and connects to one another those halves of the first straight section 6a and of the second straight section 6b of the double duct which are adjacent to the partition 5a. Separated therefrom by the deflecting wall 19, an outer passage 21 is present between said deflecting wall and the end wall 2b and connects to one another the remaining halves of the first straight section 6a and of the second straight section 6b of the double duct.

The end walls 2a,b are each part of a removable cap 22a and 22b, respectively, which also comprises segments of the side walls 1a,b, of the baseplate 3, of the cover plate 4 and of the intermediate walls 5a,c or 5b,d, which segments are adjacent to the respective end wall 2a or 2b and extend up to the respective deflecting wall 19. The deflecting walls 19 may each be part of the caps 22a,b or may, as described, can be anchored to the middle part of the ventilation device. An appropriate design can be realized by slight modification also in the case of the ventilation device according to the first embodiment. Owing to the removability of the caps, the design facilitates the cleaning and maintenance of the ventilation device.

The mode of operation corresponds exactly to that described in connection with the ventilation device according to the first embodiment. It is obvious that, in both embodiments, the length of the double duct can easily be adapted to needs and conditions with the use of components of the same type; for example, lengthening is possible by doubling the segment thereof which consists of the second straight section 6b and of the third straight section 6c.

The baseplate 3, cover plate 4, side walls 1a,b, end walls 2a,b and intermediate walls 5a–c or 5a–d of the ventilation device according to the first as well as the second embodiment may consist, for example, of wood or pressboard material or of plastic or a composite of these materials which ensure both good heat insulation and sound insulation. Filters, pollen control devices or fragrance cartridges may be installed in the incoming air duct.

Instead of being arranged in one plane, as shown in the examples, the double ducts may also be arranged, for example, in two adjacent planes which make an angle with one another, in particular a right angle, so that the ventilation device has an L-shaped configuration in the front view.

The ventilation device according to the invention is suitable in particular for installation in windows. It may be fastened instead of or behind a pane in a sash or directly in the window frame, where it then replaces a casement or a part thereof. Its orientation in space can of course differ from that shown in the examples.

List of Reference Symbols

| | |
|---|---|
| 1a, b | Side walls |
| 2a, b | End walls |
| 3 | Baseplate |
| 4 | Cover plate |
| 5a, b, c, d | Intermediate walls |
| 6a, b, c, d, e | Straight sections of the double duct |
| 7a, b, c, d | Deflections |
| 8 | Partition |
| 9 | Incoming air duct |
| 10 | Incoming air inlet |
| 11 | Incoming air outlet |
| 12 | Exhaust air duct |
| 13 | Exhaust air inlet |
| 14 | Exhaust air outlet |
| 15 | Closure wall |
| 16 | Exhaust air fan |
| 17 | Closure wall |
| 18 | Incoming air fan |
| 19 | Deflecting wall |
| 20 | Inner passage |
| 21 | Outer passage |
| 22a, b | Caps |

The invention claimed is:

1. Ventilation device comprising an incoming air duct (9), which connects an incoming air inlet (10) to an incoming air outlet (11), and an exhaust air duct (12), which connects an exhaust air inlet (13) to an exhaust air outlet (14), a segment of the incoming air duct (9) and a segment of the exhaust air duct (12) forming a heat exchanger in which they are led in the form of a double duct with opposite flows in a heat-conducting connection, the double duct comprising a plurality of successive straight sections (6a, 6b, 6c, 6d, 6e), with directly successive straight sections (6a, 6b, 6c, 6d, 6e) each being connected by deflections (7a, 7b, 7c, 7d) having a deflection angle of 180°, the double duct having an approximately rectangular cross-section in the straight sections (6a, 6b, 6c, 6d, 6e) and wherein in the straight sections (6a, 6b, 6c, 6d, 6e) of the double duct, the incoming air duct (9) is separated from the exhaust air duct (12) in each case by a partition (8) which is continuous in the longitudinal direction, the partitions (8) being arranged in each case diagonally in the double duct.

2. Ventilation device according to claim 1, wherein directly successive straight sections (6a, 6b, 6c, 6d, 6e) of the double duct are laterally directly adjacent to one another.

3. Ventilation device according to claim 2, wherein the straight sections (6a, 6b, 6c, 6d, 6e) of the double duct are arranged in a plane.

4. Ventilation device according to claim 1, wherein the partitions (8) each consist of sheet metal.

5. Ventilation device of substantially right parallelepipedic shape, with two parallel sidewalls (1a, 1b), and two parallel end walls (2a, 2b) connecting the side walls (1a, 1b), comprising an incoming air duct (9) which connects an incoming air inlet (10) to an incoming air outlet (11), and an exhaust air duct (12), which connects an exhaust air inlet (13) to an exhaust air outlet (14), a segment of the incoming air duct (9) and a segment of the exhaust air duct (12) forming a double duct laterally bounded by the side walls (1a, 1b) and serving as a heat exchanger with opposite flows in a heat-conducting connection, the double duct comprising a plurality of successive straight sections (6a, 6b, 6c, 6d, 6e), with directly successive straight sections (6a, 6b, 6c, 6d, 6e) each being connected by deflections (7a, 7b, 7c, 7d) having a deflection angle of 180° and separated in each case by one of a plurality of intermediate walls (5a, 5b, 5c, 5d) which are normal to the side wall (1a, 1b) and the end walls (2a, 2b) and each of which is adjacent laterally to both side walls (1a, 1b) and at the end to one of the end walls (2a, 2b), while a passage is left at the other end wall (2b, 2a) for the production of a deflection (7a, 7b, 7c, 7d) the corresponding segments of the incoming air duct (9) or of the exhaust air duct (12) of directly successive straight sections (6a, 6b, 6c, 6d, 6e) of the double duct being each adjacent and separated by one of the intermediate walls (5a, 5b, 5c, 5d) separating the straight sections (6a, 6b, 6c, 6d, 6e) of the double duct incoming air duct (9) being separated from the exhaust air duct (12) in each case by a partition (8) which is continuous in the longitudinal direction and arranged in each case diagonally in the double duct.

6. Ventilation device according to claim 4, wherein the sheet metal is structured aluminum sheet.

7. Ventilation device according to claim 5, wherein either the corresponding segments of the incoming air duct (9) or of the exhaust air duct (12) of directly successive straight sections (6a, 6b, 6c, 6d, 6e) of the double duct are each adjacent and are separated by one of the intermediate walls (5a, 5b, 5c, 5d) wherein the partitions (8) of directly successive straight sections (6a, 6b, 6c, 6d) of the double duct are in each case inclined in opposite directions.

8. Ventilation device according to claim 7, wherein for connecting the adjacent duct segments of the straight sections (6a, 6b, 6c, 6d) of the double duct which are connected thereto, the deflection (7a, 7b, 7c) comprises in each case a deflecting wall (19) having two triangular segments which are each adjacent at one side to the end of one of the partitions (8) flush with the intermediate wall (5a, 5b, 5c) and at a further side to a side wall (1a, 1b), while the remaining sides of the two triangular segments are adjacent to one another so that they separate an inner passage (20) connecting the adjacent duct segments, at the end of the intermediate wall (5a, 5b, 5c), from an outer passage (21) which connects the remaining duct segments of said straight sections (6a, 6b, 6c, 6d, 6e) of the double duct and is located between the deflecting wall (19) and the end wall (2a, 2b).

9. Ventilation device according to claim 5, wherein in the straight sections (6a, 6b, 6c, 6d, 6e) of the double duct, the incoming air duct (9) is separated from the exhaust air duct (12) in each case by a partition (8) which is continuous in the longitudinal direction and arranged in each case diagonally in the double duct and wherein the partitions (8) are inclined in the same direction.

10. Ventilation device according to claim 9, wherein for connecting the adjacent duct segments of the sections of the double duct which are connected there, the deflection (7a, 7b, 7c, 7d) comprises a deflecting wall (19) which is parallel to the end wall (2a, 2b) and a distance away from it and is in the shape of a parallelogram and whose sides are adjacent to the ends of the partitions (8) and to the side walls (1a, 1b), while the end of the intermediate wall (5a, 5b, 5c, 5d) is a distance away from it so that the deflecting wall (19) separates an inner passage (20) connecting the adjacent duct segments from an outer passage (21) which connects the remaining duct segments of said straight sections (6a, 6b, 6c, 6d, 6e) of the double duct and is located between the deflecting wall (19) and the end wall (2a, 2b).

11. Ventilation device according to claim 10, wherein the end walls (2a, 2b) bounding the outer passages (21), and segments of the baseplate (3), of the cover plate (4), of the side walls (1a, 1b) and of the intermediate walls (5a, 5b, 5c, 5d) which are adjacent to said end walls, are formed by removable caps (22a, 22b).

12. Ventilation device according to claim 5, wherein the side walls (1a, 1b), the end walls (2a, 2b) and the intermediate walls (5a, 5b, 5c, 5d) consist of wood or plastic.

13. Ventilation device according to claim 7, wherein the partitions (8) each consist of sheet metal.

14. Ventilation device according to claim 9, wherein the partitions (8) each consist of sheet metal.

15. Ventilation device according to claim 13, wherein the sheet metal is structured aluminum sheet.

16. Ventilation device according to claim 14, wherein the sheet metal is structured aluminum sheet.

17. Ventilation device comprising an incoming air duct (9), which connects an incoming air inlet (10) to an incoming air outlet (11), and an exhaust air duct (12), which connects an exhaust air inlet (13) to an exhaust air outlet (14), a segment of the incoming air duct (9) and a segment of the exhaust air duct (12) forming a heat exchanger in which they are led in the form of a double duct with opposite flows of incoming air and exhaust air in a heat-conducting connection, and separated from one another, the double duct comprising a plurality of successive straight sections (6a, 6b, 6c, 6d, 6e), with directly successive straight sections (6a, 6b, 6c, 6d, 6e) each being connected by deflections (7a, 7b, 7c, 7d) having a deflection angle of 180°, directly successive straight sections (6a, 6b, 6c, 6d, 6e) of the double duct being laterally directly adjacent to one another and the double duct having an approximately rectangular cross-section in the straight ections (6a, 6b, 6c, 6d, 6e) and wherein in the straight, sections (6a, 6b, 6c, 6d, 6e) of the double duct, the incoming air duct (9) is separated from the exhaust air duct (12) by a diagonal partition in the double duct.

* * * * *